(12) United States Patent
Rosén

(10) Patent No.: US 12,117,184 B2
(45) Date of Patent: Oct. 15, 2024

(54) METHOD FOR IMPROVED UTILIZATION OF ENERGY GRIDS

(71) Applicant: EMG Energimontagegruppen AB, Karlshamn (SE)

(72) Inventor: Per Rosén, Lund (SE)

(73) Assignee: EMG ENERGIMONTAGEGRUPPEN AB, Karlshamn (SE)

( * ) Notice: Subject to any disclaimer, the term of this patent is extended or adjusted under 35 U.S.C. 154(b) by 989 days.

(21) Appl. No.: 16/958,155

(22) PCT Filed: Dec. 20, 2018

(86) PCT No.: PCT/EP2018/086057
§ 371 (c)(1),
(2) Date: Jun. 26, 2020

(87) PCT Pub. No.: WO2019/129608
PCT Pub. Date: Jul. 4, 2019

(65) Prior Publication Data
US 2020/0363073 A1    Nov. 19, 2020

(30) Foreign Application Priority Data
Dec. 27, 2017  (EP) ..................................... 17210730

(51) Int. Cl.
*F24D 10/00*    (2022.01)
*F24D 19/10*    (2006.01)
(Continued)

(52) U.S. Cl.
CPC ....... *F24D 10/006* (2013.01); *F24D 19/1006* (2013.01); *F24H 15/144* (2022.01);
(Continued)

(58) Field of Classification Search
None
See application file for complete search history.

(56) References Cited

U.S. PATENT DOCUMENTS 6,223,101 B1 *   4/2001  Sakamoto .......... G05B 13/0265
                                                              700/49
10,852,022 B2 *  12/2020  Rosén ................... F24F 5/0003
(Continued)

FOREIGN PATENT DOCUMENTS

DE        3245416 A1    8/1984
DE    202011106855 U1   11/2011
(Continued)

OTHER PUBLICATIONS

International Search Report and Written Opinion mailed on Feb. 28, 2019 for PCT/EP2018/086057 filed on Dec. 20, 2018, 12 pages.
(Continued)

*Primary Examiner* — Edelmira Bosques
*Assistant Examiner* — Deepak A Deean
(74) *Attorney, Agent, or Firm* — XSENSUS LLP

(57) ABSTRACT

A local heating system is presented. The local heating system comprising: a first heat source (10) connectable to a heating grid (110) and arranged to extract heat from the heating grid (110); a second heat source (20) connectable to an electrical energy grid (120) and to transform electricity feed through the electrical energy grid (120) into heat; a heat emitting device (30); a distribution system (40) for circulating heat transfer fluid between the heat emitting device (30) and the first and second heat sources (10, 20); and a controller (50) configured to control the first and second heat source's (10, 20) relative outtake of heat from the heating grid (110) and the electrical energy grid (120), respectively.

16 Claims, 2 Drawing Sheets

(51) Int. Cl.
  *F24H 15/144* (2022.01)
  *F24H 15/16* (2022.01)
  *F24H 15/37* (2022.01)
  *F24H 15/176* (2022.01)
  *F24H 15/262* (2022.01)

(52) U.S. Cl.
  CPC ............ *F24H 15/16* (2022.01); *F24H 15/37* (2022.01); *F24D 2200/08* (2013.01); *F24D 2200/12* (2013.01); *F24D 2200/13* (2013.01); *F24H 15/176* (2022.01); *F24H 15/262* (2022.01); *Y02B 30/17* (2018.05)

(56) References Cited

U.S. PATENT DOCUMENTS

| | | | | |
|---|---|---|---|---|
| 10,983,484 | B2* | 4/2021 | Vanhoudt | G05B 13/0265 |
| 2005/0222784 | A1* | 10/2005 | Tuff | G01D 4/008 |
| | | | | 702/61 |
| 2013/0138256 | A1* | 5/2013 | Sako | G05B 15/02 |
| | | | | 700/286 |
| 2015/0066229 | A1* | 3/2015 | Lacroix | G05F 1/66 |
| | | | | 700/295 |
| 2016/0334116 | A1* | 11/2016 | Zaynulin | F24D 10/006 |
| 2019/0154288 | A1* | 5/2019 | Adirim | F24D 10/00 |
| 2019/0324411 | A1* | 10/2019 | Vanhoudt | G05B 13/0265 |

FOREIGN PATENT DOCUMENTS

| | | |
|---|---|---|
| DE | 102013015503 A1 | 8/2014 |
| EP | 2369243 A2 | 9/2011 |
| WO | 2008/102292 A2 | 8/2008 |
| WO | 2010/102626 A2 | 9/2010 |

OTHER PUBLICATIONS

Office Action issued on Oct. 18, 2022, in corresponding European patent Application No. 18830252.5, 7 pages.

* cited by examiner

METHOD FOR IMPROVED UTILIZATION OF ENERGY GRIDS

CROSS-REFERENCE TO RELATED APPLICATION

The present application is based on PCT filing PCT/EP2018/086057, filed Dec. 20, 2018, which claims priority to EP 17210730.2, filed Dec. 27, 2017, the entire contents of each are incorporated herein by reference.

TECHNICAL FIELD

The present invention relates to a method of controlling a local heating system comprising a first heat source connected to a heating grid and a second heat source connected to an electrical energy grid.

BACKGROUND

Nearly all large developed cities in the world have at least two types of energy distribution grids incorporated in their infrastructures: one grid for providing heating and one grid for providing electricity. The grid for providing heating may e.g. be used for providing comfort and/or process heating, and/or hot tap water preparation. The grid for providing electricity may be used for providing power to household appliances, electric cars, lighting devices, etc.

A common grid for providing heating is a gas grid providing a burnable gas, typically a fossil fuel gas. The gas provided by the gas grid is locally burned at a building for providing comfort and/or process heating, and/or hot tap water preparation. An alternative grid for providing heating is a district heating grid. The district heating grid is used for providing heated heat transfer liquid, typically in the form of water, to buildings of the city. A centrally placed heating and pumping plant is used for heating and distributing the heat transfer liquid. The heat transfer liquid is delivered to buildings of the city via one or more feed conduits and is returned to the heating and pumping plant via one or more return conduits. Locally at a building heat from the heat transfer liquid is extracted via a heat exchanger to a local heating system. Further alternative, electrical energy of the electrical energy grid may be used for heating. The electrical energy may e.g. be used for heating tap water or for heating local heat transfer liquid used for comfort and/or process heating.

The use of energy for heating is steadily increasing influencing the environment negatively. By improving utilization of the energy distributed in the energy distribution grids, negative influences on the environment may be reduced. Hence, there is a need for improving utilization of the energy distributed in energy distribution grids.

SUMMARY OF INVENTION

It is an object of the invention to mitigate the above mentioned drawbacks by improving utilization of a plurality of energy grids.

According to a first aspect, this object has been achieved by a method for controlling a primary local heating system. The primary local heating system comprising a first heat source connectable to a heating grid, a second heat source connectable to an electrical energy grid, one or more heat emitting devices for providing comfort heating, and a distribution system for circulating heat transfer fluid between said one or more heat emitting devices and the first and second heat sources. Upon operating the present method, the first heat source is connected to the heating grid and the second heat source is connected to the electrical energy grid. The method comprises determining a temporally resolved heating control parameter indicating a temporally resolved overall heating consumption need of a plurality of local heating systems, connected to the heating grid, in relation to a temporally resolved overall available heating capacity of the heating grid. The method further comprises determining a temporally resolved electric power control parameter indicating a temporally resolved overall electric power need in relation to a temporally resolved overall available electric power of the electrical energy grid to which the second heat source is connected. Also, the method comprises controlling, based on a comparison of the temporally resolved heating control parameter and the temporally resolved electric power control parameter, a relative outtake of heat from the first and second heat sources. The relative outtake is controlled such that the temporally resolved heating control parameter times the outtake of heat from the first heat source, plus the temporally resolved electric power control parameter times the outtake of heat from the second heat source, is optimized.

The temporally resolved overall heating consumption need may be predicted by collecting historical data from properties consuming heat. The historical data may be attributed with time data, such as time of day and day of year. The historical data may further be attributed with weather data, such as wind properties, rainfall, snowfall, outdoor temperature, outdoor humidity etc. The temporally resolved overall heating consumption need may then be predicted from the historical data, time data, and/or weather forecast data. In addition, data related to the different properties consuming heat may be used in order to predict the temporally resolved overall heating consumption need.

The temporally resolved overall electric power need may be predicted by collecting historical data from electricity consumers. The historical data may be attributed with time data, such as time of day and day of year. The historical data may further be attributed with weather data, such as wind properties, rainfall, snowfall, outdoor temperature, outdoor humidity etc. The temporally resolved overall electric power need may then be predicted from the historical data, time data, and/or weather forecast data.

Each of the plurality of local heating systems comprises a heat source connectable to the heating grid, one or more heat emitting devices for providing comfort heating, and a distribution system for circulating heat transfer fluid between said one or more heat emitting devices and the heat source. The plurality of local heating systems may comprise the primary local heating system.

It should be understood that the input of energy, deliverance efficiency and/or capacity of the heating grid and the electrical energy grid, respectively, varies over time.

For example, temporal variations in overall available electric power of the electrical energy grid may be due to temporary use of extra energy production plants, and/or due to use of electricity production plants which production varies over time, such as solar power, wind power, and/or tidal power. The use of electricity production plants which production varies over time is bound to increase in the future. Also, variations may be due to variations in water levels in the water reservoirs of hydroelectric plants. Further, overall available electric power may vary due to damages to the electrical energy grid or shut downs at power plants feeding the electrical energy grid.

Similarly, the overall available heating capacity of the heating grid may vary over time. This due to temporary use of extra energy production plants feeding the heating grid, due to increase of availability of geothermal energy feeding the heating grid, or due to of excess in material for combustion in a combustion power plant used to feed the heating grid. Further, overall available heating capacity of the heating grid may vary over time due to damages to the heating grid or shut downs of one or more power plants feeding the heating grid.

The overall heating consumption need may vary over time. Factors influencing the overall heating consumption need comprises cold outdoor temperature, wind conditions, occupancy of buildings in which the local heating systems delivers comfort heating, radiation from the sun, time of day, day of week and/or time of year. For example, the overall heating consumption need may decrease during periods with no wind and/or with relatively high outdoor temperatures. According to a further example, the overall heating consumption need may decrease or during weekends when some office buildings are controlled for lower indoor temperature. According to yet another example, the overall heating consumption need may increase during periods with windy conditions and/or with relatively low outdoor temperatures.

The overall electric power need may vary over time. Factors influencing the overall electric power need comprises outdoor temperatures, wind conditions, occupancy of buildings in which the electrical energy grid delivers electrical power, radiation from the sun, time of day, day of week and/or time of year.

The temporally resolved heating control parameter may indicate a temporally resolved relation between supply and demand of heating energy, giving a 'virtual cost' of consuming an amount of capacity of the heating grid.

The temporally resolved electric power control parameter may indicate a temporally resolved relation between supply and demand of electric power, giving a 'virtual cost' of consuming an amount of capacity of the electrical energy grid.

The heating and energy power control parameters may be normalized to a common scale. Thus, they can more easily be compared to each other.

By introducing the heating and energy power control parameters and determining values thereof and then control the relative outtake of heat from the first and second heat sources based on these values, it is possible to compensate for imbalances between overall needs compared to overall available capacity/power. If there, e.g., is a comparably high overall demand in overall heating consumption need it may be beneficial to control the relative outtake of heat from the first and second heat sources such that heat is mainly or fully taken from the second heat source connected to the electrical energy grid. On the other hand, if there, e.g., is a comparably high overall demand in overall electric power need it may be beneficial to control the relative outtake of heat from the first and second heat sources such that heat is mainly or fully taken from the second heat source connected to the electrical energy grid The heating and energy power control parameters may also be used to take into account other factors than purely the relation between the overall need and the available capacity. The parameters may also take into account the environmental impact of the production of heating energy and electrical energy. The parameters may also take into account predictions. If the total heating need reaches a critical point where it is almost necessary to start-up another heating plant, the heating control parameter may be determined and then set to indicate an even greater overall heating consumption need than is actually the case and thereby steer the outtake of heat such that primarily the second heat source connected to the electrical heating grid is used. Hence, the need for heating capacity from the heating grid may be reduced and thereby hopefully avoiding start-up of extra heat production plants configured to input heat to the heating grid.

The heating and energy power control parameters may be expressed as price per energy amount. The control parameters may be expressed as a numerical index value having no direct relation to an energy amount.

By the above method, energy outtake may be dynamically adjusted between the heating grid and the electrical energy grid. Hence, outtake from the energy distribution grid currently proving most resource efficient energy may be made. This may enable decreased environmental impact. For example, energy could be taken out only from the electrical energy grid, or only from the heating grid, or partly from both grids in varying proportions. Hence, the outtake may depend on what is optimal at the current period of time.

According to one example, the relative outtake may be optimized such that the temporally resolved heating control parameter times the outtake of heat from the first heat source, plus the temporally resolved electric power control parameter times the outtake of heat from the second heat source, is minimized. By minimized is in this context not limited to an actual minimum in the function for the relative outtake. It is enough that one comes sufficiently close to the actual minimum. For example, within 20% of the actual minimum. Preferably, within 10% of the actual minimum.

A specific situation in which to use only the electrical energy grid for heating would be if circumstances are such that there is a limited or insufficient capacity of the heating grid in relation to current demand of heat. Alternatively, energy could be taken out only from the heating grid if circumstances are such that there is a much limited production capacity of the electrical energy grid in relation to current demand of electricity in the whole electric power grid.

Further, by providing the above method in a plurality of primary local heating systems connected to the same heating grid and electrical energy grid, respectively, it is possible to connect a greater number of local heating system to a grid of a certain capacity, to allow for greater changes in heating need for the different users, to allow for more intermittent production of heating energy and/or electrical energy.

The temporally resolved heating control parameter may comprise information pertaining to an amount of emitted greenhouse gases per energy unit of heat provided via the heating grid. By also utilizing information pertaining to amount of emitted greenhouse gases per energy unit of heat provided via the heating grid, it is possible to control the local heating systems relative outtake of heat from the heating grid such that emission of greenhouse gas is mitigated, for example by taking out such heat at times when heat production is made by resources producing less greenhouse gas.

The temporally resolved heating control parameter may comprise information pertaining to an efficiency of the first heat source's capability to transfer heat from the heating grid to the heat transfer fluid of the distribution system. By also utilizing information pertaining to efficiency of the first heat source's capability to transfer heat from the heating grid to the heat transfer fluid of the distribution system, it is possible to further improve energy efficient outtake or heat, thereby enabling decreased environmental impact.

The temporally resolved heating control parameter may comprise information pertaining to cost per energy unit of heat provided via the heating grid. By also utilizing information pertaining to cost per energy unit of heat provided via the heating grid, it is possible to more easily compare cost of using each heat source, such that cost can more easily be used to control relative outtake of heat.

The temporally resolved electric power control parameter may comprise information pertaining to amount of emitted greenhouse gases per energy unit of electricity of the electrical energy grid. By also utilizing information pertaining to amount of emitted greenhouse gases per energy unit of electricity of the electrical energy grid, it is possible to control the local heating systems relative outtake of heat from the electric power grid such that emission of greenhouse gas is mitigated, for example by taking out such heat energy at times when electrical power production is made by resources producing less greenhouse gas.

The temporally resolved electric power control parameter may comprise information pertaining to an efficiency of the second heat source's capability to transform electric energy from the electrical energy grid to heat in the heat transfer fluid of the distribution system.

The temporally resolved electric power control parameter may comprise information pertaining to cost per energy unit of electricity of the electrical energy grid. By also utilizing information pertaining to cost per energy unit of electricity of the electrical energy grid, it is possible to more easily compare cost of using electricity for heating, such that cost can more easily be used to control relative outtake of heat.

The first heat source may be a heat exchanger or heat pump connected to the heating grid.

The second heat source may be a resistive electric heater.

According to a second aspect the above object(s) has/have been achieved by a local heating system. The local heating system comprising: a first heat source connectable to a heating grid and arranged to extract heat from the heating grid; a second heat source connectable to an electrical energy grid and to transform electricity feed through the electrical energy grid into heat; a heat emitting device; a distribution system for circulating heat transfer fluid between the heat emitting device and the first and second heat sources; and a controller configured to control the first and second heat source's relative outtake of heat from the heating grid and the electrical energy grid, respectively.

The controller may be configured to base the control on a comparison of a temporally resolved heating control parameter and a temporally resolved electric power control parameter, wherein the temporally resolved heating control parameter is indicative of a temporally resolved overall heating consumption need of a plurality of local heating systems, connected to the heating grid, in relation to a temporally resolved overall available heating capacity of the heating grid, and wherein the temporally resolved electric power control parameter is indicative of a temporally resolved overall electric power need in relation to a temporally resolved overall available electric power of the electrical energy grid.

The controller may further be configured to control the relative outtake of heat from the first and second heat sources such that the temporally resolved heating control parameter times the outtake of heat from the first heat source plus the temporally resolved electric power control parameter times the outtake of heat from the second heat source is optimized.

According to one example, the relative outtake may me optimized such that the temporally resolved heating control parameter times the outtake of heat from the first heat source, plus the temporally resolved electric power control parameter times the outtake of heat from the second heat source, is minimized. By minimized is in this context not limited to an actual minimum in the function for the relative outtake. It is enough that one comes sufficiently close to the actual minimum. For example, within 20% of the actual minimum. Preferably, within 10% of the actual minimum.

The second heat source may be arranged in the distribution system.

The second heat source may be an electric resistive heater.

The first heat source may be a heat exchanger or a heat pump.

The above mentioned features of the method, when applicable, apply to this second aspect as well. In order to avoid undue repetition, reference is made to the above.

According to a third aspect the above object(s) has/have been achieved by a controller. The controller is configured to control a relative outtake of heat from a first heat source connected to a heating grid and a second heat source connected to an electrical energy grid, the first and second heat sources belonging to a local heating system. The controller is further configured to control the relative outtake of heat from the first heat source and the second heat source such that a temporally resolved heating control parameter times an outtake of heat from the first heat source plus a temporally resolved electric power control parameter times an outtake of heat from the second heat source is minimized. The temporally resolved heating control parameter indicates a temporally resolved overall heating consumption need of a plurality of local heating systems, the plurality of local heating systems being connected to the heating grid, in relation to a temporally resolved overall available heating capacity of the heating grid. The temporally resolved electric power control parameter indicates a temporally resolved overall electric power need in relation to a temporally resolved overall available electric power of the electrical energy grid to which the second heat source is connected.

The controller may further be configured to determine the temporally resolved heating control parameter and/or the temporally resolved electric power control parameter locally.

The controller according may further be configured to control the first heat source's outtake of heat from the heating grid by controlling a control valve.

The above mentioned features of the method and the local heating system, when applicable, apply to this third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention.

DETAILED DESCRIPTION OF PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
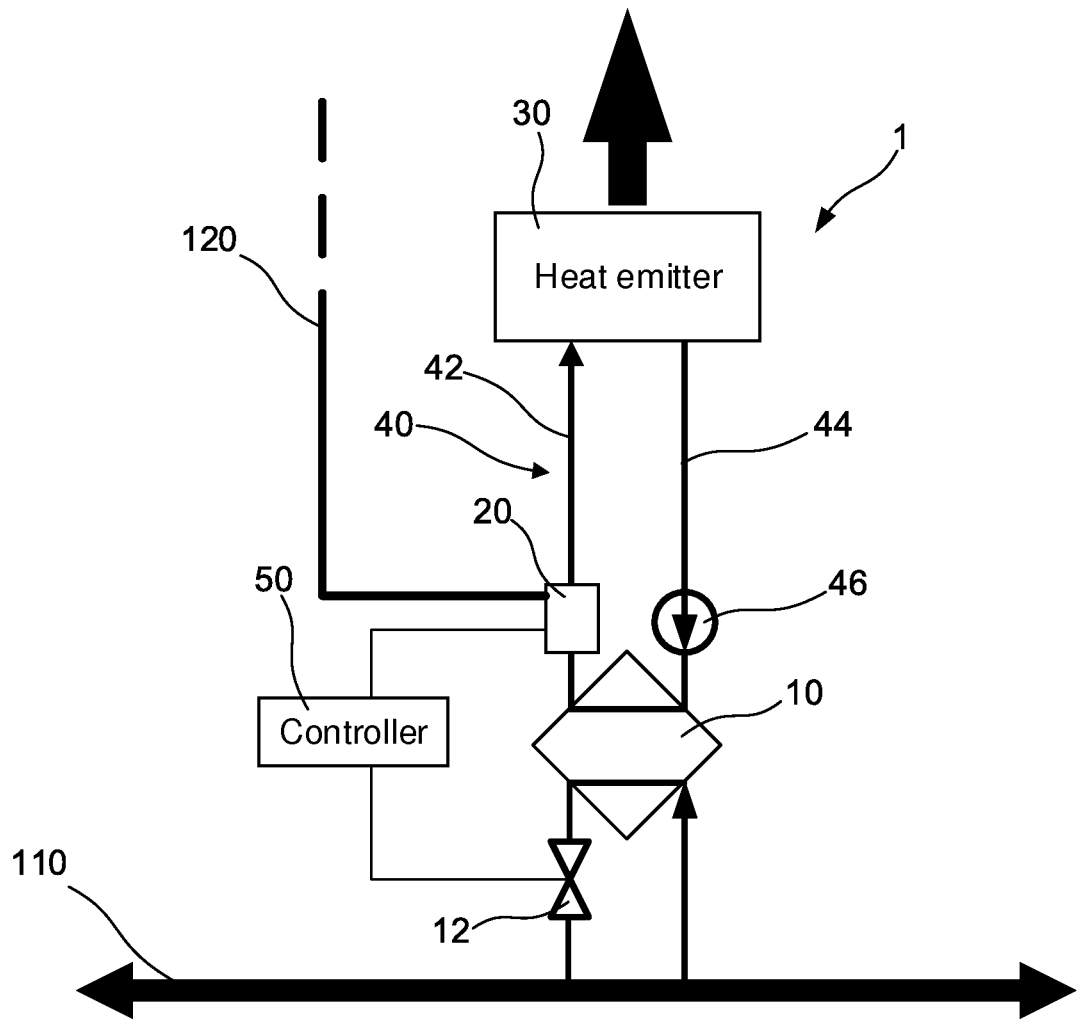
FIG. 1 is a schematic view of a local heating system comprising a first heat source and a second heat source.

With reference to FIG. 1 a local heating system 1 will be discussed. The local heating system 1 comprises a first heat source 10, a second heat source 20, a heat emitting device 30, and a distribution system 40 for circulating heat transfer fluid between the heat emitting device 30 and the first and second heat sources 10, 20.

The first heat source 10 is connected to a heating grid 110. The heating grid 110 is configured to distribute heat to the first heat source 10.

The heating grid 110 may be a district heating system. The district heating system comprises a hydraulic network comprising a district feed conduit for an incoming flow of district heat transfer fluid and a district return conduit for a return flow of district heat transfer fluid. In the district heating system, a driving pressure difference between district feed conduit and district return conduit of the hydraulic network creates a so called "pressure cone" whereby the pressure in the district feed conduits is higher than the pressure in the return conduits. This pressure difference circulates district heat transfer fluid in the hydraulic network between a central heat production plant and the local heating systems connected to the district heating system. Further, one or more district grid circulation pumps are arranged in the district heating system in order to provide the driving pressure difference. In case the heating grid 100 is a district heating system, the first heat source 10 is a heat exchanger. Again, this is the embodiment illustrated in FIG. 1.

Alternatively, the heating grid 110 may be a district thermal energy distribution system as defined in WO 2017/076868. In this case, the first heat source 10 is a thermal energy consumer heat exchanger as defined in WO 2017/076868 and/or WO2017/076866.

Yet alternatively, the heating grid 110 may be gas distribution grid configured to distribute a burnable gas. In this case, the first heat source 10 is a gas burner.

The distribution system 40 comprises a feed line 42 and a return line 44. The distribution system 40 may further comprise a circulation pump 46. The first heat source 10 is fluidly connected to the feed line 42 and the return line 44 for letting heat transfer fluid flow from the return line 44 via the first heat source 10 and into the fed line 42. While doing so the first heat source 10 is configured to heat heat transfer fluid of the distribution system 40 flowing through the first heat source 10. Hence, the first heat source 10 is configured to transfer heat from the heating grid 110 to heat transfer fluid of the distribution system 40.

The second heat source 20 is connected to an electrical energy grid 120. The second heat source 20 is typically an electric resistive heater. The second heat source 20 is arranged in the distribution system 40. Preferably, the second heat source 20 is arranged on the feed line 42.

The heat emitting device 30 is configured to provide comfort heating. The heat emitting device 30 may be a radiator. The local heating system 1 may comprise a plurality of heat emitting devices 30. The heat emitting device 30 is configured to emit heat to its surroundings. Typically, the heat emitting device 30 is arranged in a room of a building.

The first heat source 10 may transmit heat from heat transfer fluid of the heating grid 110 to heat transfer fluid in the distribution system 40 of the local heating system 1. In this way, heat can be generated remotely in a large scale heat production plant (not shown) and emitted locally, far away from the plant. The plants may for example use geothermal energy or energy from other processes such as combustion of household garbage. The produced heat is then distributed through the heating grid 110 to a plurality of local heating systems where it is taken out by heat sources connected to the heating grid 110.

In addition to, or instead of using heat from the first heat source 10, heat can be generated locally in the local heating system 1 using the second heat source 20 by feeding electricity from the electrical energy grid 120 into second heat source 20 which then heats the heat transfer fluid of the distribution system 40 of the local heating system 1.

Since the electrical energy grid 120 operates differently from the heating grid 110, negative effects of a shortage or malfunction of either the heating grid 110 or the electrical energy grid 120 can be mitigated by increasing the utilization of the other respective heat source 10, 20. The decisions about which heat source to use and to what extent, can be controlled locally at each local heating system 1, or centrally by a controller connected to each respective local heating system 1 connected to the heating grid 110 and/or the electrical energy grid 120.

The local heating system may further comprise a controller 50 configured to control the first and second heat sources 10, 20 outtake of heat. The controller 50 is configured to control the first and second heat sources 10, 20 relative outtake of heat from the heating grid 110 and the electrical energy grid 120, respectively. The relative control does not mean the first and second heat sources 10, 20 have to be used one at a time; Rather they can be used either one at a time or simultaneously, and to varying degree of relative energy outtake from each heat source 10, 20.

The controller 50 is configured to control a relative outtake of heat from the first and second heat sources 10, 20. The controller 50 is configured to base the control on a comparison of a temporally resolved heating control parameter and a temporally resolved electric power control parameter. The temporally resolved heating control parameter is indicative of a temporally resolved overall heating consumption need of a plurality of local heating systems, connected to the heating grid 110, in relation to a temporally resolved overall available heating capacity of the heating grid 110. The controller 50 may be configured to determine the temporally resolved heating control parameter locally. Alternatively, the controller 50 may be feed with the temporally resolved heating control parameter from a central server (not shown) configured to determine the temporally resolved heating control parameter. The temporally resolved electric power control parameter is indicative of a temporally resolved overall electric power need in relation to a temporally resolved overall available electric power of the electrical energy grid 120. The controller 50 may be configured to determine the temporally resolved electric power control parameter locally. Alternatively, the controller 50 may be feed with the temporally resolved electric power control parameter from a central server (not shown) configured to determine the temporally resolved electric power control parameter.

The controller 50 is further configured to control the relative outtake of heat from the first and second heat sources 10, 20 such that the temporally resolved heating control parameter times the outtake of heat from the first heat source plus the temporally resolved electric power control parameter times the outtake of heat from the second heat source is optimized. According to one example, the relative outtake may me optimized such that the temporally resolved heating control parameter times the outtake of heat from the first heat source, plus the temporally resolved electric power control parameter times the outtake of heat from the second heat source, is minimized. By minimized is in this context not limited to an actual minimum in the function for the relative outtake. It is enough that one comes sufficiently close to the actual minimum. For example, within 20% of the actual minimum. Preferably, within 10% of the actual minimum.

The first heat source's 10 outtake of heat from the heating grid 110 may be controlled by controlling a control valve 12. By controlling the control valve 12 the flow of heat transfer fluid of the heating grid into the first heat source 10 is controlled. The controller 50 may be configured to control the control valve 12. The control valve 12 may as in the in FIG. 1 shown embodiment be located at a return line arranged to return heat transfer fluid from the first heat source 10 to the heating grid. This set-up may e.g. be used in the case of the heating grid 110 is a grid configured to heated heat transfer fluid in a grid configured to transport thermal heat. Alternatively, the control valve 12 may be located at a feed line arranged to feed heat transfer fluid from the heating grid 110 to the first heat source 10. This set-up may e.g. be used if the heating grid 110 is a grid providing a burnable gas and the first heat source 10 is a gas burner.

Hence, the control of the relative outtake of heat from the first and second heat sources 10, 20 may be based on data analysis. Optionally the control of the relative outtake of heat from the first and second heat sources 10, 20 may be based on data analysis in combination with manual decisions and overrides.

Figure 2:
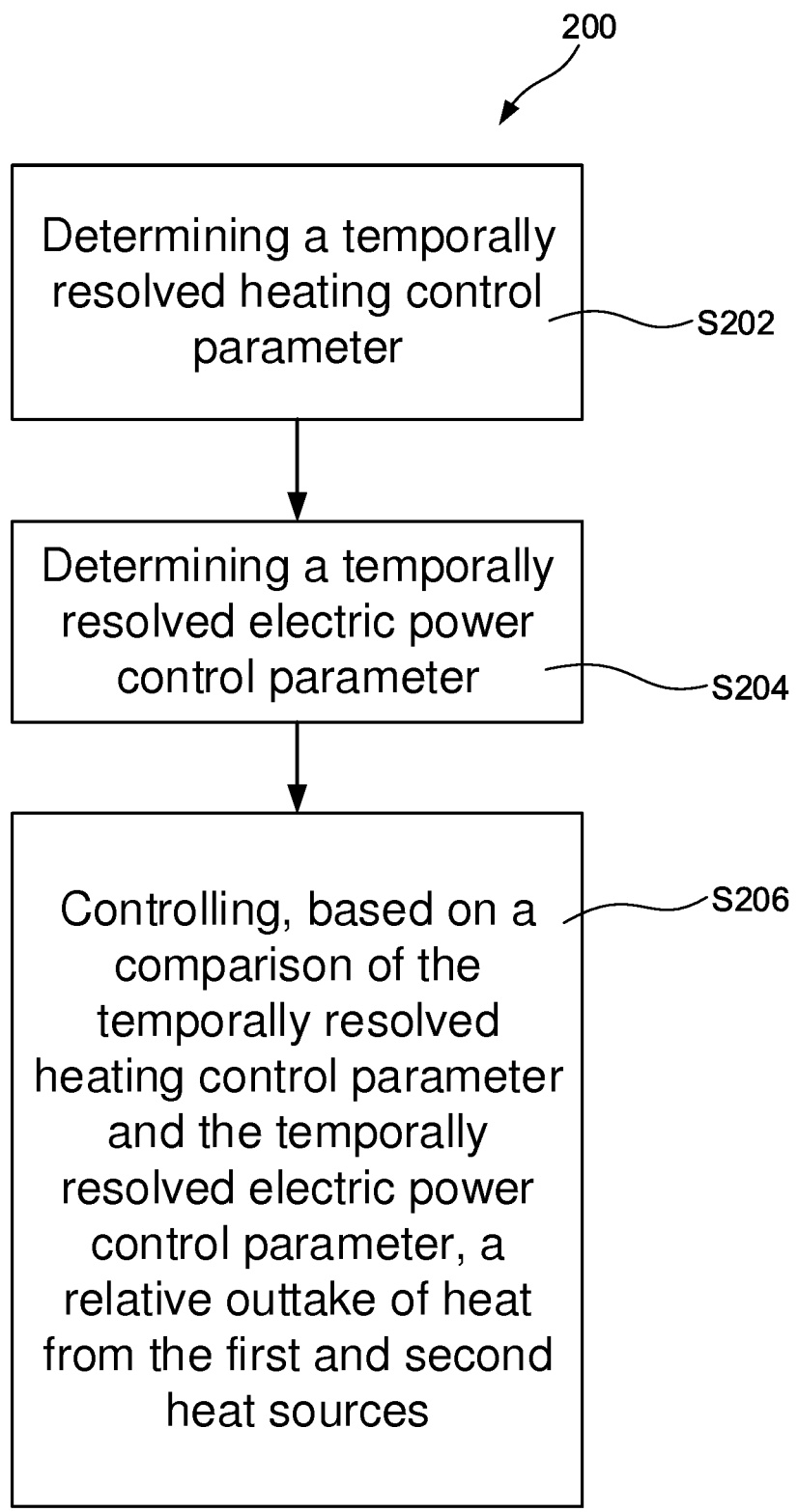
FIG. 2 is block diagram of a method 200 for controlling a relative outtake of heat from the first and second heat sources of the local heating system of FIG. 1.

With reference to FIG. 2 a method 200 for controlling a relative outtake of heat from the first and second heat sources 10, 20 of a local heating system 1 according to above will be discussed. The method 200 comprises determining S202 a temporally resolved heating control parameter indicating a temporally resolved overall heating consumption need of a plurality of local heating systems, connecting to the heating grid, in relation to a temporally resolved overall available heating capacity of the heating grid. Temporally resolved overall heating consumption need of a plurality of local heating systems could comprise information as to how much energy is needed for heating of the plurality of local heating systems over a predetermined period of time. This could be based on historical data but also based on forecasting. The temporally resolved overall available heating capacity of the heating grid may for example be determined upon historical data but also based on forecasting such as based on weather forecasts. Local sensors for each local heating system could be used to report local weather data, such as outdoor temperature, wind and outdoor humidity, which data could then be used to assist in determining temporally resolved overall or local heating consumption need.

The method 200 further comprises determining S204 a temporally resolved electric power control parameter indicating a temporally resolved overall electric power need in relation to a temporally resolved overall available electric power of the electrical energy grid to which the second heat source is connected.

Further, the method 200 comprises controlling S206, based on a comparison of the temporally resolved heating control parameter and the temporally resolved electric power control parameter, a relative outtake of heat from the first and second heat sources. The outtake is controlled such that the temporally resolved heating control parameter times the outtake of heat from the first heat source, plus the temporally resolved electric power control parameter times the outtake of heat from the second heat source, is optimized. According to one example, the relative outtake may me optimized such that the temporally resolved heating control parameter times the outtake of heat from the first heat source, plus the temporally resolved electric power control parameter times the outtake of heat from the second heat source, is minimized. By minimized is in this context not limited to an actual minimum in the function for the relative outtake. It is enough that one comes sufficiently close to the actual minimum. For example, within 20% of the actual minimum. Preferably, within 10% of the actual minimum.

The predetermined period of time for temporal analysis depends on the circumstances of each energy distribution grid, such as the resolution and delay of data collected from local heating systems, heat production plants or electricity production plants. For example, the predetermined period of time may be 1 hour, 2 hours, 6 hours or 24 hours. Other periods of time are also possible within the scope of the present disclosure.

Overall available heating capacity relates to all produced heating, i.e. not taking consumed heating into account. Similarly, overall available electric power relates to all produced electric power, i.e. not taking consumed electric power into account.

The temporally resolved heating control parameter may comprise information pertaining to an amount of emitted greenhouse gases per energy unit of heat provided via the heating grid.

The temporally resolved heating control parameter may comprise information pertaining to an efficiency of the first heat source's capability to transfer heat from the heating grid to the heat transfer fluid of the distribution system.

The temporally resolved heating control parameter may comprises information pertaining to cost per energy unit of heat provided via the heating grid.

The temporally resolved electric power control parameter may comprise information pertaining to amount of emitted greenhouse gases per energy unit of electricity of the electrical energy grid.

The temporally resolved electric power control parameter may comprise information pertaining to an efficiency of the second heat source's capability to transform electric energy from the electrical energy grid to heat in the heat transfer fluid of the distribution system.

The temporally resolved electric power control parameter may comprises information pertaining to cost per energy unit of electricity of the electrical energy grid.

The person skilled in the art realizes that the present invention by no means is limited to the preferred embodiments described above. On the contrary, many modifications and variations are possible within the scope of the appended claims.

For example, the controller 50 may be embodied in many different ways. According to one example the controller 50 may be a single controller configured to control both the first and second heat sources 10, 20. According to another example, the controller 50 may be a distributed controller comprising two or more controller modules. For example, a first controller module may be configured to control the first heat source 10 and a second controller module may be configured to control the second heat source 20. The first and second controller modules are configured to communicate with each other and exchange data. The communication may be wired or wireless.

Additionally, variations to the disclosed embodiments can be understood and effected by the skilled person in practicing the claimed invention, from a study of the drawings, the disclosure, and the appended claims.

The invention claimed is:

1. A method for controlling a primary local heating system comprising a first heat source connected to a heating grid, a second heat source connected to an electrical energy grid, one or more heat emitting devices for providing comfort heating, and a distribution system for circulating heat transfer fluid between said one or more heat emitting devices and the first and second heat sources, the method comprising:
   determining a temporally resolved heating control parameter (TRHCP), the TRHCP indicating a temporally resolved overall heating consumption need of a plurality of local heating systems in relation to a temporally resolved overall available heating capacity of the heating grid,
   wherein the plurality of local heating systems are connected to the heating grid,
   determining a temporally resolved electric power control parameter (TREPC), the TREPC indicating a temporally resolved overall electric power need in relation to a temporally resolved overall available electric power of the electrical energy grid to which the second heat source is connected,
   comparing the TRHCP to the TREPC to generate a comparison result; and
   based on the comparison result, controlling an outtake of heat from the first heat source (heat outake$_1$) and an outtake of heat from the second heat source (heat outake$_2$) to minimize a performance parameter (P),
   wherein P=(the TRHCP× the heat outake$_1$)+(the TREPC× the heat outake$_2$).

2. The method according to claim 1, wherein the TRHCP comprises information pertaining to an amount of emitted greenhouse gases per energy unit of heat provided via the heating grid.

3. The method according to claim 1, wherein the TRHCP comprises information pertaining to an efficiency of the first heat source's capability to transfer heat from the heating grid to the heat transfer fluid of the distribution system.

4. The method according to claim 1, wherein the TRHCP comprises information pertaining to cost per energy unit of heat provided via the heating grid.

5. The method according to claim 1, wherein the TREPC comprises information pertaining to amount of emitted greenhouse gases per energy unit of electricity of the electrical energy grid.

6. The method according to claim 1, wherein the TREPC comprises information pertaining to an efficiency of the second heat source's capability to transform electric energy from the electrical energy grid to heat in the heat transfer fluid of the distribution system.

7. The method according to claim 1, wherein the TREPC comprises information pertaining to cost per energy unit of electricity of the electrical energy grid.

8. The method according to claim 1, wherein the first heat source is a heat exchanger or a heat pump connected to the heating grid.

9. The method according to claim 1, wherein the second heat source is a resistive electric heater.

10. A local heating system, comprising:
   a first heat source connectable to a heating grid and arranged to extract heat from the heating grid;
   a second heat source connectable to an electrical energy grid and to transform electricity feed through the electrical energy grid into heat;
   a heat emitting device;
   a distribution system for circulating heat transfer fluid between the heat emitting device and the first and second heat sources; and
   a controller configured to
   determine a temporally resolved heating control parameter (TRHCP), the TRHCP indicating a temporally resolved overall heating consumption need of a plurality of local heating systems in relation to a temporally resolved overall available heating capacity of the heating grid,
   wherein the plurality of local heating systems are connected to the heating grid,
   determine a temporally resolved electric power control parameter (TREPC), the TREPC indicating a temporally resolved overall electric power need in relation to a temporally resolved overall available electric power of the electrical energy grid to which the second heat source is connected,
   compare the TRHCP to the TREPC to generate a comparison result; and
   based on the comparison result, control an outtake of heat from the first heat source (heat outake$_1$) and an outtake of heat from the second heat source (heat outake$_2$) to minimize a performance parameter (P),
   wherein P=(the TRHCP× the heat outake$_1$)+(the TREPC× the heat outake$_2$).

11. The local heating system according to claim 10, wherein the second heat source is arranged in the distribution system.

12. The local heating system according to claim 10, wherein the second heat source is an electric resistive heater.

13. The local heating system according to claim 10, wherein the first heat source is a heat exchanger or a heat pump.

14. A controller configured to control a relative outtake of heat from a first heat source connected to a heating grid and a second heat source connected to an electrical energy grid, the first and second heat sources belonging to a local heating system;
   wherein the controller is configured to
   determine a temporally resolved heating control parameter (TRHCP), the TRHCP indicating a temporally resolved overall heating consumption need of a plurality of local heating systems in relation to a temporally resolved overall available heating capacity of the heating grid,
   wherein the plurality of local heating systems are connected to the heating grid,
   determine a temporally resolved electric power control parameter (TREPC), the TREPC indicating a temporally resolved overall electric power need in relation to a temporally resolved overall available electric power of the electrical energy grid to which the second heat source is connected,
   compare the TRHCP to the TREPC to generate a comparison result; and
   based on the comparison result, control an outtake of heat from the first heat source (heat outake$_1$) and an outtake of heat from the second heat source (heat outake$_2$) to minimize a performance parameter (P),
   wherein P=(the TRHCP× the heat outake$_1$)+(the TREPC× the heat outake$_2$).

15. The controller according to claim 14, further configured to determine at least one of the TRHCP or the TREPC locally.

16. The controller according to claim 14, further configured to control the first heat source's outtake of heat from the heating grid by controlling a control valve.

* * * * *